2,855,768

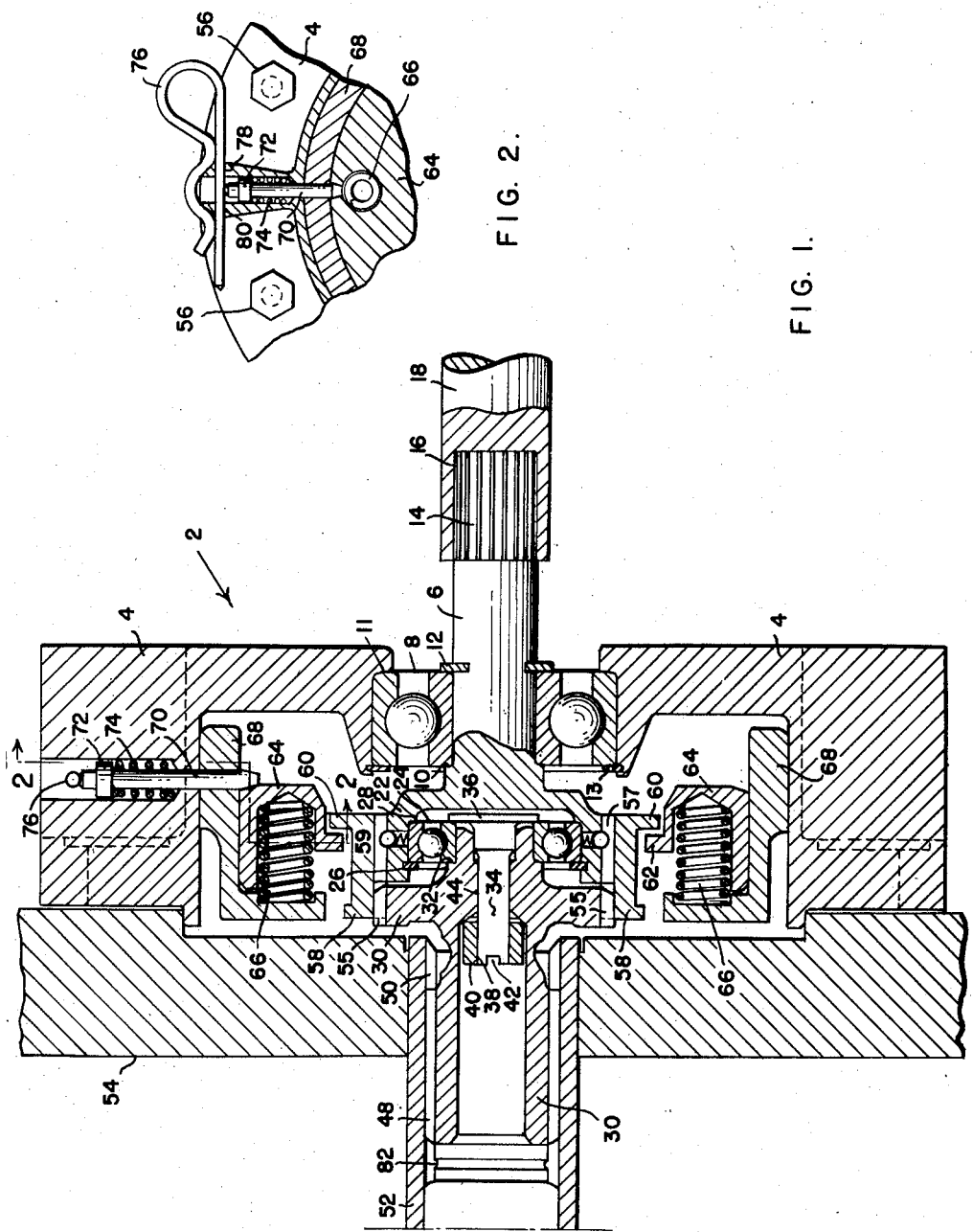
Oct. 14, 1958 — P. A. PLANO — 2,855,768
LATCHED RELEASE POSITIVE CLUTCH
Filed April 26, 1955
INVENTOR.
PHILIP A. PLANO United States Patent Office 2,855,768
Patented Oct. 14, 1958

LATCHED RELEASE POSITIVE CLUTCH

Philip A. Plano, Philadelphia, Pa., assignor to O. E. Szekely & Associates, Inc., Philadelphia, Pa., a corporation of Pennsylvania Application April 26, 1955, Serial No. 503,908

5 Claims. (Cl. 64—28)

This invention relates to a latched release positive clutch which is frequently referred to simply as a disconnect device. More particularly, this invention relates to a disconnect device which can be used, for example, between a motor and a driven device such as, for example, a generator.

It is the broad object of this invention to provide a disconnect device for use, for example, between driven and driving devices.

It is an additional object of this invention to provide a disconnect device which is positive in its operation.

It is a still further object of this invention to provide a disconnect device which can be readily used to connect two shafts irrespective of the means by which the disconnect device is secured to these shafts.

These and other objects of this invention will become apparent on reading the following description in conjunction with the drawings in which:

Figure 1 is a vertical section through a disconnect device in accordance with this invention.

Figure 2 is a section taken on the plane indicated by the line 2—2 in Figure 1.

As shown in Figure 1, a disconnect device 2 has a casing member 4 on which a shaft 6 is mounted by means of a ball bearing 8. Bearing 8 abuts against shoulder 10 and clip ring 12 of shaft 6 and against shoulder 11 and clip ring 13 of casing 4. Shaft 6 has a splined male end 14 which is adapted to engage the splined female end 16 of a driven shaft 18 of, for example, a generator. It will be understood, of course, that the means of connecting the shafts 14 and 16 may be any convenient means.

Shaft 6 has an enlarged hollow end 22 which is carried by a roller bearing 24 which abuts against clip ring 26 and shoulder 28 in enlarged end 22. Bearing 24 is supported by hollow shaft 30 which has a shoulder 32 for engaging one side of bearing 24. The other side of bearing 24 is engaged by a pin 34 having an enlarged head 36. Pin 34 has a threaded portion 38 which is engaged by a threaded member 40 for securing pin 34 in the reduced opening 44 of shaft 30. A slot 42 is provided in pin 34 for convenience in securing, permitting the use of, for example, a screwdriver. Illustrative of typical securing means, shaft 30 has a splined end 48 which is adapted to engage a female splined end 50 of, for example, a driven shaft 52, the shaft 52 being driven, for example, by a motor having a casing 54. As shown in Figure 2, casing member 4 is bolted to casing 54 by bolts 56.

A splined ring 58 is adapted to engage enlarged splined end 55 of shaft 30 and a splined portion 57 of the enlarged end 22 of shaft 6. A spring biased detent 59 normally keeps the splined ring 58 in engagement with splined end 55 and splined portion 57.

The splined ring 58 has a peripheral flange 60 which is adapted to be engaged by an adjacent peripheral flange 62 on hollow ring 64. Compression coil springs 66 act to bias flange 62 towards flange 60, the springs 66 having one end abutting against ring 64 and the other end abutting against a flange member 68 which is fixedly secured to casing 4.

A plunger 70 having an enlarged head portion 72 is mounted in casing 4 with its lower end adapted to engage the face of ring 64. Plunger 70 is provided with an enlarged head 72 which, in turn, is biased upwardly by a compression coil spring 74. A wire clip 76 passes through openings 78 and 80 in casing 4 above plunger 70 and is adapted to maintain the plunger downwardly against spring 74.

Shaft 30 is provided with a sheer section 82.

During normal operation, shafts 30 and 6 will rotate together being fixedly secured together by splined ring 58. When it is desired to disconnect the driving element from the driven element, this can be positively and rapidly accomplished by means of clip 76. This results in spring 74 forcing plunger 70 upwardly clear of ring 64 which, in turn, permits springs 66 to force flange 62 of ring 64 into engagement with flange 60 of splined ring 58 to carry the splined ring out of engagement with the splined end 55 of shaft 30. At this juncture, shafts 6 and 30 can move relative to each other being only connected by bearing 24.

It is not desired to be limited except as set forth in the following claims.

What is claimed is:

1. A disconnect device adapted to releasably connect a driving member and a driven member comprising a casing member, a pair of coaxial shafts carried by said casing and having adjacent splined inner ends, the outer ends of said shafts being adapted to be connected to a driving device and a driven device respectively, a splined ring adapted to engage said splined ends, a spring biased ring adjacent and overlapping said splined ring, holding means to retain said spring biased ring out of engagement with said splined ring, means to release said holding means to permit the spring biased ring to move the splined ring out of engagement with one of said shafts.

2. A disconnect device adapted to releasably connect a driving member and a driven member comprising a casing member, a pair of coaxial shafts having adjacent splined inner ends, the outer ends of said shafts being adapted to be connected to a driving device and a driven device respectively, a bearing connecting said shafts, a splined ring adapted to engage said splined ends, a spring biased ring adjacent and overlapping said splined ring, holding means to retain said spring biased ring out of engagement with said splined ring, means to release said holding means to permit the spring biased ring to move the splined ring out of engagement with one of said shafts.

3. A disconnect device adapted to releasably connect a driving member and a driven member comprising a casing member, a pair of coaxial shafts carried by said casing and having adjacent splined inner ends, the outer ends of said shafts being adapted to be connected to a driving device and a driven device respectively, a splined ring adapted to engage said splined ends, detent means to hold said splined ring in engagement with said splined ends, a spring biased ring adjacent and overlapping said splined ring, holding means to retain said spring biased ring out of engagement with said splined ring, means to release said holding means to permit the spring biased ring to move the splined ring out of engagement with one of said shafts.

4. A disconnect device adapted to releasably connect a driving member and a driven member comprising a casing member, a pair of coaxial shafts carried by said casing and having adjacent splined inner ends, the outer ends of said shafts being adapted to be connected to a driving device and a driven device respectively, a splined ring adapted to engage said splined ends, detent means to hold said splined ring in engagement with said splined ends, a spring biased ring adjacent and overlapping said splined ring, holding means to retain said spring biased ring out of engagement with said splined ring, said holding means comprising a plunger having a lower portion adapted to engage the face of the spring biased ring, spring means biasing said plunger upwardly and removable retaining means holding said plunger against the spring means biasing the plunger.

5. A disconnect device adapted to releasably connect a driving member and a driven member comprising a casing member, a pair of coaxial shafts carried by said casing and having adjacent splined inner ends, the outer ends of said shafts being adapted to be connected to a driving device and a driven device respectively, a splined ring adapted to engage said splined ends, detent means to hold said splined ring in engagement with said splined ends, a spring biased ring biased by a plurality of compression coil springs positioned adjacent its periphery, said spring biased ring being adjacent and overlapping said splined ring, holding means to retain said spring biased ring out of engagement with said splined ring, means to release said holding means to permit the spring biased ring to move the splined ring out of engagement with one of said shafts.

References Cited in the file of this patent

UNITED STATES PATENTS

| | | |
|---|---|---|
| 1,696,179 | Ahlm | Dec. 25, 1928 |
| 1,948,150 | Whitted | Feb. 20, 1934 |
| 2,575,379 | Benning | Nov. 20, 1951 |
| 2,651,394 | Sinclair | Sept. 8, 1953 |
| 2,727,371 | Troeger et al. | Dec. 20, 1955 |

FOREIGN PATENTS

| | | |
|---|---|---|
| 356,140 | Great Britain | Sept. 2, 1931 |